UNITED STATES PATENT OFFICE.

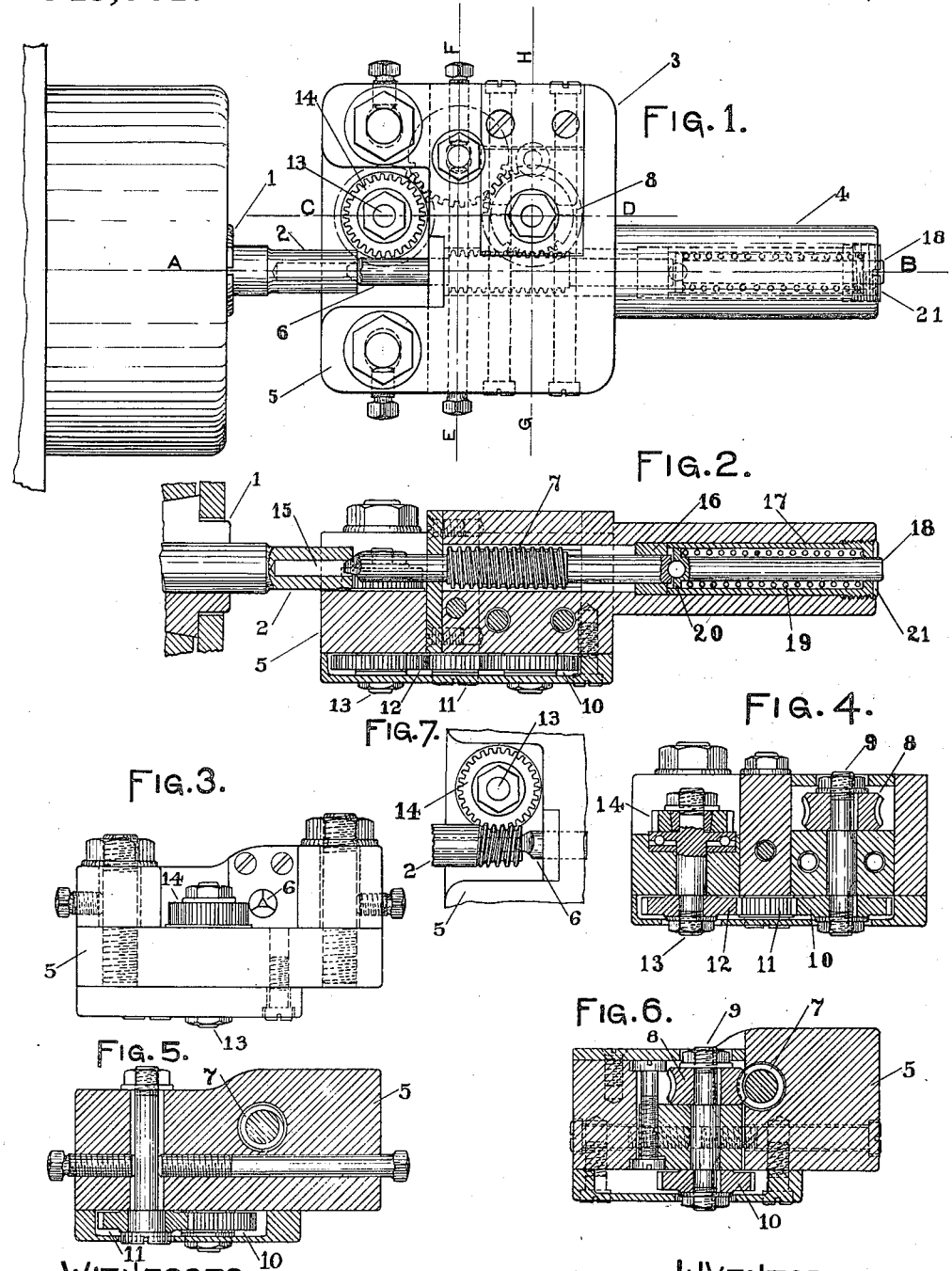

FREDERICK E. ANTHONY, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

SCREW-CUTTING ATTACHMENT.

945,901.  Specification of Letters Patent.  Patented Jan. 11, 1910.

Application filed October 12, 1906. Serial No. 338,577.

*To all whom it may concern:*

Be it known that I, FREDERICK E. ANTHONY, of Providence, county of Providence, and State of Rhode Island, have invented certain new and useful Improvements in Screw-Cutting Attachments; and I do hereby declare the following specification, taken in connection with the accompanying drawings and forming a part of the same, to be a full, clear, and exact description thereof.

The invention relates to an attachment for screw-machines, and has for its object to provide an attachment whereby screw-threads of any form, depth or pitch may be rapidly produced. Ordinarily in these machines the screws are cut by means of dies, but there is a limit to the depth and pitch of a screw-thread which can be properly and advantageously cut by a die. Heretofore when it has been desired to produce screws having threads of a greater depth or pitch than could be conveniently cut by a die, it has been customary to cut such screws in a lathe by means of an ordinary lathe-tool. But this involves repeated passes of the tool along the screw-blank, a greater or less number of passes being required according to the depth of the thread to be cut.

The object of the present invention is to provide an attachment whereby threads of a depth or pitch which could not be properly cut by means of a die may be rapidly produced and with only a single passage of the cutting tool past the work.

To that end the invention consists primarily in a screw-cutting attachment adapted to be mounted in the tool-carrier of a screw-machine and provided with a rotary cutter and means for rotating the same, whereby as the cutter is moved along the work, or the work is moved lengthwise with relation to the cutter, a thread is progressively cut thereon to the desired depth by the action of the successive teeth of said rotary cutter.

A further feature of the invention consists in the employment in such a screw-cutting attachment of a master-screw for revolving the rotary cutter and controlling the pitch of the thread to be cut thereby.

A further feature of invention consists in providing means for rotating the rotary cutter from the work-spindle of the machine through the work carried thereby.

A further feature of invention consists in providing means for controlling the rotation of the cutter by the movements of the reciprocating tool-carrier in which the rotary cutter is mounted, the arrangement being such that as the tool-carrier advances to bring the rotary cutter up to the work the rotary cutter will be caused to be rotated, the further advancing movement of the tool-carrier serving to move the rotating cutter along the work to cut the screw-thread thereon.

The invention further consists in certain features of construction and in combinations and arrangements of parts hereinafter described and set forth in the claims.

Referring to the drawings, Figure 1 is a plan view of the attachment, showing also the end of the work-spindle of a screw-machine with the rod of stock from which the screws are to be formed projecting therefrom; Fig. 2 is a longitudinal section on the line A—B, Fig. 1; Fig. 3 is an end view of the attachment; Fig. 4 is a section on the line C—D, Fig. 1; Fig. 5 is a section on the line E—F, Fig. 1; Fig. 6 is a section on the line G—H, Fig. 1; and Fig. 7 is a detail showing the operation of the rotary cutter in cutting the thread.

1 represents the rotating work-spindle of a screw-machine, and 2 the rod of stock held therein from which the screws are to be made.

3 represents the attachment as a whole, said attachment being provided with a shank 4, by which it may be held in the tool-carrier of the machine. The attachment also embodies a frame or casing 5 in which the rotary cutter and the other operating parts are mounted.

Mounted to revolve in the frame 5 is a spindle 6 provided with a screw 7. Said screw 7 engages a worm-wheel 8 secured to a short shaft 9 mounted to revolve in the frame. Secured to said shaft 9 is a gear 10 which meshes with an intermediate idler gear 11, which latter gear meshes with a gear 12 secured to the shaft 13 mounted in the frame. To said shaft 13 is secured the rotary cutter 14.

. Suitable means are provided and shown in the drawings for adjusting the shafts 9 and 13 and holding them in proper position which it will not be necessary to describe in detail.

The forward end of the screw-spindle 6 is tapered and adapted to enter a recess 15 formed in the end of the rod of stock 2, and preferably the end of said spindle is made triangular or of other polygonal form in cross section as shown, in order that when said spindle is, by the advancing movement of the tool-carrier, brought into engagement with said rod there may be a practically positive connection betwen the rod and said spindle to revolve the latter.

In order to cut a screw-thread upon the rod of stock it is necessary that the tool-carrier shall continue to advance after the screw-spindle has been brought into engagement with the rod of stock, and to enable this to be done said screw-spindle is mounted in the frame 5 so as to be movable lengthwise with relation to said frame and the other parts carried thereby. As shown in Fig. 2, the rear end of the screw-spindle 6 is mounted in a bearing 16 secured in the shank 4. Said shank 4 is made hollow and mounted therein in rear of the screw-spindle is a hollow sleeve 17, within which is mounted a spring pressed plunger 18, having the spring 19 surrounding the shank of said plunger and bearing at one end against the head 20 of the plunger and at the other end against the closed end 21 of the sleeve 17.

With the construction and arrangement of parts above described the operation is as follows: By the advancing movement of the tool-carrier carrying the screw-cutting attachment the tapered end of the screw-spindle 6 is brought into operative engagement with the rod of stock which is rotated by the work-spindle, and so that the rotary movement of said work-spindle and the rod carried thereby will be imparted to said screw-spindle, which will be thus rotated by the work-spindle through the rod of stock and at the same speed as said rod. The rotation of said screw-spindle causes a corresponding rotation of the worm-wheel 8, and through the interposed gearing of the rotary-cutter 14. The parts are so constructed and arranged that when, by the advancing movement of the tool-carrier, the tapered end of the screw-spindle has been brought into engagement with the rod of stock, and the rotary cutter thereby caused to be rotated, said rotary cutter will be in proper position, as shown in Fig. 1, to begin the operation of cutting a screw-thread on the rod. As the tool-carrier continues to advance, the frame 5 and all the parts mounted therein will be advanced, except the screw-spindle 6 and the spring-pressed plunger 18, which will be prevented from advancing farther by reason of the engagement of the end of the screw-spindle with the rod of stock which is firmly held by the jaws of the chuck in the work-spindle, the further advance of the other parts being permitted by the yielding of the spring 19. The continued advance of the tool-carrier referred to causes the worm-wheel 8 to travel along the screw 7 and this imparts a slight rotation to said worm-wheel in addition to the rotary movement imparted thereto by the rotation of the screw, but this additional rotary movement of the worm-wheel is also transmitted through the interposed gears to the rotary cutter.

It is preferred to make the rotary cutter and the worm-wheel of the same size, that is, with the same number of teeth in each, and also to make the gears 10 and 12 of equal size. If desired, however, the number of teeth in the rotary cutter may be some multiple of the number of teeth in the worm-wheel, in which case the ratio of the gears 10 and 12 should be made to correspond, and so that the rotary cutter will at all times be revolved in unison with the worm-wheel.

With the construction above described, as will be seen, the screw 7, which may be termed the master-screw, is revolved by the rod of stock and is consequently revolved, and must be revolved, at the same speed as said rod and in unison therewith. So also any advancing movement of the worm-wheel 8 lengthwise with relation to the master-screw is accompanied by a corresponding advancing movement of the rotary cutter lengthwise with relation to the rod of stock. Consequently with the worm-wheel revolved, as it is, by the master-screw, and with the rotary cutter revolved through the interposed gearing in unison with said worm-wheel, the pitch of the thread cut by the rotary cutter upon the rod will be controlled by, and will correspond with, the pitch of the master-screw. In order, therefore, to cut a screw of any desired pitch it is simply necessary to employ a master screw of the pitch required, the worm-wheel and rotary cutter being changed to correspond, and it will be seen that with the construction shown the master-screw may be readily removed and another substituted in its place. It will be further seen that the rotation of the master-screw and of the rotary cutter is intermittently effected by the advancing and retracting movements of the tool-carrier in which the screw-cutting attachment is mounted, and also that the construction is such that the attachment and its operating parts, with the exception of the master-screw, may continue to advance and so as to carry the rotary cutter lengthwise along the rod of stock, after the spindle of the master-screw has been brought into engagement with said rod and caused to be rotated therewith.

As will be understood the cutting of the screw-thread upon the rod of stock will be progressively effected to the desired depth by the action of the successive teeth of the rotary cutter as said cutter is advanced along said rod and rotated by the master-screw, and the cutting of the complete thread will be accomplished by a single passage of the rotary cutter.

In the above description of the operation of the attachment shown it has been assumed that the attachment was employed in connection with a screw-machine in which the tool-carrier is advanced and retracted toward and from the work-spindle. It will be understood, however, that the attachment may also be employed in a machine in which the work-spindle is advanced and retracted toward and from the tool-carrier, and that in such case it will be the advancing movement of the work-spindle which will effect the operative engagement of the screw-spindle with the rod of stock, and which will further cause the travel or lengthwise movement of the rod of stock with relation to the rotary cutter to effect the cutting of the thread.

What I claim as my invention and desire to secure by Letters Patent is:

1. A screw-cutting attachment provided with means whereby it may be mounted in the tool-carrier of a screw-machine, said attachment comprising a rotary cutter adapted to generate a screw-thread and means for rotating the same.

2. A screw-cutting attachment provided with means whereby it may be mounted in the tool-carrier of a screw-machine, said attachment comprising a rotary cutter adapted to generate a screw-thread and a master-screw for revolving said cutter.

3. A screw-cutting attachment provided with means whereby it may be mounted in the tool-carrier of a screw-machine, said attachment comprising a rotary cutter adapted to generate a screw-thread and a master screw for revolving said cutter and controlling the pitch of the thread to be cut thereby.

4. A screw-cutting attachment adapted to be mounted in the tool-carrier of a screw-machine, said attachment comprising a rotary cutter and means for rotating said cutter from the work carried in the work-spindle of the machine.

5. A screw-cutting attachment adapted to be mounted in the tool-carrier of a screw-machine, said attachment comprising a master-screw adapted to be rotated by the work carried in the work-spindle of the machine and a rotary cutter operated by said master-screw.

6. A screw-cutting attachment adapted to be mounted in the tool-carrier of a screw-machine, said attachment comprising a master-screw adapted to engage and be rotated by the rod of stock held in the work-spindle of the machine, and a rotary cutter operated by said master-screw.

7. A screw-cutting attachment adapted to be mounted in the tool-carrier of a screw-machine, said attachment comprising a rotary cutter and means for intermittently rotating said cutter from the work carried in the work-spindle of the machine, the intermittent rotation of the cutter being controlled by the reciprocating movements of the tool-carrier or of the work-spindle.

8. A screw-cutting attachment provided with means whereby it may be mounted in the tool-carrier of a screw-machine, said attachment comprising a master-screw and a rotary cutter operated thereby, said rotary cutter being capable of movement lengthwise with relation to said master-screw.

9. A screw-cutting attachment provided with means whereby it may be mounted in the tool-carrier of a screw-machine, said attachment comprising a master-screw, a worm-wheel in engagement therewith, and a rotary cutter operated by said worm-wheel.

10. A screw-cutting attachment provided with means whereby it may be mounted in the tool-carrier of a screw-machine, said attachment comprising a master-screw, a worm-wheel in engagement therewith, and a rotary cutter operated by said worm-wheel, said worm-wheel and rotary cutter being capable of movement lengthwise with relation to said master-screw.

11. A screw-cutting attachment adapted to be mounted in the tool-carrier of a screw-machine, said attachment comprising a frame, a master-screw mounted to rotate in said frame, and a rotary cutter mounted in said frame and operated by said master-screw, said frame and rotary cutter being capable of movement lengthwise with relation to said master-screw.

12. A screw-cutting attachment adapted to be mounted in the tool-carrier of a screw-machine, said attachment comprising a frame, a master-screw mounted to rotate in said frame, and adapted to be brought by the advance of said tool-carrier into engagement with the rod of stock held in the work-spindle of the machine and so as to be rotated thereby, and a rotary cutter mounted in said frame and operated by said master-screw, said frame and rotary cutter having the capacity to move lengthwise with relation to said master-screw when the latter has been brought into engagement with the rod of stock.

FREDERICK E. ANTHONY.

Witnesses:
W. H. THURSTON,
J. H. THURSTON.